United States Patent [19]

Schaar

[11] 4,101,306
[45] Jul. 18, 1978

[54] MOULDING TOOL
[75] Inventor: Lothar Schaar, Heuerssen, Fed. Rep. of Germany
[73] Assignee: Hermann Heye, Obernkirchen, Fed. Rep. of Germany
[21] Appl. No.: 775,603
[22] Filed: Mar. 8, 1977
[30] Foreign Application Priority Data
Mar. 9, 1976 [DE] Fed. Rep. of Germany ....... 2609651
[51] Int. Cl.² ............................ C03B 9/40; C03B 9/00
[52] U.S. Cl. ........................................ 65/323; 65/359; 65/360; 65/361
[58] Field of Search ................. 65/323, 359, 360, 361, 65/227

[56] References Cited
U.S. PATENT DOCUMENTS

| | | | |
|---|---|---|---|
| 1,845,654 | 2/1932 | Flexon | 65/360 |
| 1,939,917 | 12/1933 | Patterson | 65/360 X |
| 3,251,668 | 5/1966 | Brymer | 65/361 X |
| 3,268,322 | 8/1966 | Denman | 65/360 X |
| 3,617,233 | 11/1971 | Mumfor | 65/359 X |
| 3,967,946 | 7/1976 | Campbell | 65/359 X |

Primary Examiner—Richard V. Fisher
Assistant Examiner—Frank W. Miga
Attorney, Agent, or Firm—Michael J. Striker

[57] ABSTRACT

A moulding tool for a machine for moulding plastic material, especially molten glass, comprises at least one mould middle section divided into a plurality of middle section parts, and operating means having members each carrying with clearance a respective one of the mould middle section parts for opening and closing movements transversely of the longitudinal axis of the mould and transversely guiding the parts in two axially spaced guide planes by means of guide elements.

17 Claims, 20 Drawing Figures

FIG.18

MOULDING TOOL

BACKGROUND OF THE INVENTION

The invention relates to a moulding tool for a machine for processing glass or other plastic material, the tool comprising at least one mould middle section divided into middle section parts, and an operating device having members each carrying with clearance a respective one of the mould middle section parts for opening and closing movements transversely of the longitudinal axis of the respective mould and transversely guiding the parts in two spaced guide planes by means of guide elements.

A known moulding tool of this kind (West German Offenlegungsschrift 2,355,030) comprises a multiple mould with which appertaining mould middle section halves are respectively on their outside provided with a downwardly extending flange at their upper end and, approximately in half their longitudinal extension, with a headed screw. The flange, with radial clearance, is suspended on a suspension console of a tong half forming the operating device. A head of the headed screw, with radial clearance, engages downwardly in a groove of the tong half. Thus two radial guide planes are defined. The mould middle section halves are not secured in the axial direction and so under unfavorable operating conditions can be lifted upwardly and fall out of the operating device. Two pressure members of the appertaining tong half engage each mould middle section half, whereby two axial holding closed force zones are defined. The pressure members are arranged in spaced relationship and one above the other respectively below one of said two guide planes.

The object of this known moulding tool is to exert to the mould middle sections of all the individual moulds of said multiple mould a holding closed force of like magnitude. To this end all the pressure members of each tong half are constantly connected to each other via a closed hydraulic channel system, so that, when the moulding tool is firmly closed, each pressure member exerts a holding closed force of like magnitude to the appertaining mould middle section. In this condition the mould middle section halves shall be held by the tong halves freely movably in the radial direction and "floatingly." A disadvantage is that the line of action of the holding closed force resulting from both the pressure members of each mould middle section half does not coincide with the line of action of the resultant opening force acting on the respective mould middle section half. That is why it is known to happen that the mould middle section will open either at its top or at its bottom and split apart obliquely under the internal pressure existing during the processing. This results in the formation of more or less coarse seams on the parisons and on the finished hollow glass products. These seams are unsightly and degrade the strength and quality of the product. They can also result in rejected articles, in particular at the finishing mould stage. Furthermore the tendency to split open involves unequal wear of the mould middle sections. On account of the mould cracking or splitting it is not possible to produce all types of hollow glass articles with the known moulding tools.

Another disadvantage is that the radially "floating" suspension of the mould middle sections on the tongs precludes centering of the mould middle sections with respect to the remainder of the moulding tool. This may lead to uneven production and increased wear of the moulding tool.

With the known moulding tool the holding closed force is applied by the tongs. If the tong halves are not absolutely parallel to the longitudinal axes of the individual moulds, oblique and edgewise contacting of the pressure members and the mould middle sections and, with the piston-like pressure members, jamming between the pressure members and their cylinders may occur. This again enhances the wear and creates the danger of leakages in the hydraulic system resulting in the loss of the critical preadjustment thereof. Said preadjustment and consequently desired functioning of the known moulding tool are also endangered by the continuous operational temperature changes of the moulding tool.

When the machine is in operation, due to the occurrence of irregular thermal loads, e.g. during the starting up of the machine, correspondingly irregular thermal expansion takes place of the mould middle section and the operating device, so that correspondingly wide tolerances must be available in the means for suspension and guidance between the mould middle section and the operating device. At the times when the mould middle sections are not securely closed, the effect of these tolerances is to allow varying oscillations of the mould middle sections about a transverse axis with respect to the operating device, and wear between these parts caused by the resulting impacts. This again increases the machine noise. These disadvantages further accumulate as the production speed increases.

SUMMARY OF THE INVENTION

One object of the present invention is to assure that the holding closed force is transmitted in a definite manner to the mould middle section, so as to avoid an undesirable gaping of the parts of the mould middle section and of other parts of the moulding tool during a moulding process. A further object of the invention is to reduce the wear on the moulding tool and the means for its suspension and guidance.

These objects are obtained by the present invention in that the total force for holding closed the parts of the mould middle section is transmitted by the operating device to these parts in such a manner that the line of action of the resultant holding closed force component for each part of the mould middle section coincides substantially with the line of action of the resultant opening force component of the respective part of the mould middle section, while each resultant holding closed force component substantially coincides with the respective mould opening force component.

The resultant mould opening force component originates firstly from the forces acting internally of the moulding tool, and secondly from the forces which arise due to any mechanical clamping between the mould middle section and one or more of the other parts of the moulding tool, and which likewise have the tendency to open the mould center section. The force effects acting internally of the moulding tool include the internal pressure resulting from the pressing or preliminary blowing in the parison forming phase resulting from the final blowing in the finishing mould phase.

In each part of the mould middle section the resultant of these internal force effects passes through the surface centroid of the projected surface of the particular part of the mould middle section which is in contact with the plastic material being moulded. Therefore the invention takes into account, in the concept of the resultant opening force, all those forces acting in the direction of opening when the moulding tool is in the closed condition, and for solving the problem dealt with by the invention these forces are overcome by the selection of the point of application of the holding closed force. This applies independently of the variations in length of the moulding tool caused by varying thermal stresses. Preferably the mould middle section comprises two parts, which are movable at right angles to the longitudinal axis of the moulding tool by means of the operating device, for example tongs. The invention is applicable not only to an individual mould but likewise to a moulding tool having a plurality of such moulds, for example a double mould.

According to one practical form of the invention the total force for holding closed the parts of the mould middle section is transmitted to said parts by the operating device in a common holding closed force plane directed at right angles to the longitudinal axis of the moulding middle section or in an axial holding closed force zone. By these means the outlay expended for transmitting the holding closed force zone is in any case only a small part of the total axial length of the mould middle section and is finally determined according to the necessary magnitude of the contact surface between the operating device and the mould middle section, in order that the permissible surface pressures may not be exceeded when applying the holding closed force.

According to a further practical form of the invention a guide plane is situated at either side of the holding closed force plane or the holding closed force zone. In such a case the spacing distance between the two guiding planes may be comparatively large, and any possible pivoting of the parts of the mould middle section about a transverse axis can be kept comparatively small.

According to another practical form of the invention the total force for holding closed the parts of the mould middle section is transmitted to said parts by the operating device in two holding closed force planes or axial holding closed force zones axially spaced from each other and each directed at right angles to the longitudinal axis of the moulding tool. In this case, as compared with the application of the force in only one holding closed force plane or holding closed force zone, the technical outlay for the transmission of the holding closed force planes or holding closed force zones can be available for other purposes, for example special arrangements for conveying cooling air.

According to a further practical form of the invention, the operating device for each part of the mould middle section comprises a pivoting frame, which is firstly connected through a joint to a support for the operating device, and secondly is provided, in each of the two holding closed force planes or holding closed force zones, with at least one holding closed force transmission element cooperating with the respective middle section part of the mould. Appropriately, according to the invention, the joint is designed as a ball joint. The joint makes possible automatic pivoting adjustment of the parts of the mould with respect to each other, when the mould middle section is closed.

According to a further practical form of the invention there is arranged between each support and the appertaining pivoting frame at least one biased spring element for adjusting a definite rest position of the pivoting frame. In particular this rest position can be so selected that the longitudinal axes of the individual parts of the mould middle section extend parallel to each other. For this purpose the spring force of at least one of the spring elements can be adjustable.

According to a further practical form of the invention each part of the mould middle section engages over the appertaining part of the operating device by means of guide elements, in which case at least one guide element is directed oppositely to the other guide element or elements. Notwithstanding an axial clearance between the operating device and the guide elements made necessary on account of the relative changes in length due to thermal influences, the arrangement here discussed ensures that the parts of the mould middle section can no longer fall out of the operating device.

According to a further practical form of the invention each part of the mould middle section is insertable with circumferential clearance into the appertaining part of the operating device by pivoting about its longitudinal axis, and is again removable therefrom, while when the mould part is in the inserted condition a releasable locking device prevents further pivoting thereof. The locking device may include a spring loaded bolt having circumferential clearance with respect to the appertaining part of the mould middle section.

According to a further practical form of the invention at least one spring element of each part of the operating device constantly bears with bias against the appertaining part of the mould middle section and, when the mould middle section is open, all radial clearance between the part of the operating member and the appertaining guiding elements in the outward or the inner direction is brought to zero. This arrangement has the substantial advantage that even when the mould middle section is open the parts thereof are no longer able to pivot about a transverse axis. On the contrary these parts are then situated in a definite position, preferably with their longitudinal axes exactly parallel to each other. This arrangement avoids the continual and constantly changing impact between the suspended parts, which was present in the known arrangements, as well as avoiding the accompanying wear and noise. Moreover, upon closing the mould middle section, the parts thereof move towards each other in an optimum relative position and interengage in the region of the conventional matching cross-sections in a manner such that the amount of wear on the parts is reduced to a minimum. This applies in a like manner to other components of the moulding tool, for example the neck mould, which in the closed position engages with the mould middle section. The spring elements can be so adjusted that above-mentioned advantages apply also in the case where the parts of the mould middle section are influenced not only by closing and opening accelerations but also by additional accelerations resulting from movements superimposed upon the entire moulding tool. An example of such additional acceleration is the centripetal acceleration arising from the use of a rotating table. According to a feature of the invention the spring element is arranged in the locking force plane or in the locking force zone. In such a case the best arrangement is one in which only one spring element is used for each part of the mould middle section. Moreover in such a case the applied forces necessary for holding closed the parts of the mould middle section are transmitted in a particularly favorable manner to said parts in the holding closed force plane or the holding closed force zone.

According to a further practical form of the invention each component part of the operating device comprises one or more holding closed force transmission elements. The holding closed force transmission elements may according to the invention be of block shape and may be designed complementary to an oppositely positioned contact surface of the respective part of the mould middle section. The holding closed force transmission element or elements of at least one part of the mould middle section may, according to the invention, be designed of spherical or blade form in respect of that part thereof which comes into contact with the appropriate part of the mould middle section. In each case it is possible, when closing the mould middle section, to position the respective part thereof easily and accurately to suit the end position of the oppositely positioned part of the mould middle section and thereby to effect the desired uniform transmission of the holding closed force into the mould middle section.

According to a further practical form of the invention, for the purpose of closing the mould tool a mould middle section engages with a part of a neck mould for the three-dimensional relative positioning of the neck mould and the mould middle section by the use of positioning surfaces thereof, while the neck mould is positioned in the axial direction in a resilient manner upon a neck mould support. In such an arrangement it is advantageous for the neck mould to be drawn axially towards the mould middle section so that the axial end position of the closed moulding tool is determined by the mould middle section. The axially exerted spring force is then smaller than the weight of the mould middle section. In any case the moulding tool is then closed in opposition to defined forces.

For the purpose of compensating for faulty alignment, it is possible in accordance with the invention to arrange the neck mould to be mounted for movement in the radial direction upon the neck mould support. This radial movement may also be under spring control, so that even when the moulding tool is in the open condition the neck mould will, under spring force, be centered in the normal radial position.

According to a further practical form of the invention, for the purpose of closing the moulding tool the mould middle section is arranged to engage over a portion of a block mould, or a parison mould bottom or a finishing mould bottom for the purpose of achieving relative three-dimensional positioning by the use of positioning surfaces, while the block mould, the parison mould bottom and the finishing mould bottom are spring mounted in the axial direction upon a support for the parison mould bottom member or upon a finishing mould bottom support. By this means advantages are gained which are analogous to those achieved by the spring controlled axial positioning of the neck mould.

Furthermore according to the invention the block mould, the parison mould bottom and the finishing mould bottom may be mounted for movement in the radial direction upon the parison mould bottom support or upon the finishing mould bottom support. Also these facilities for radial motion can be spring controlled to give advantages similar to those achieved in the spring mounting of the neck mould.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
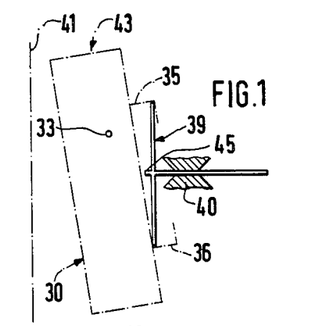
FIGS. 1 to 5 schematically indicate parts of the mould middle section in various positions and phases of movement.

In FIG. 1 there is shown a part 30 of a mould middle section, in this case one-half of the mould middle section, having a center of gravity diagrammatically indicated at 33 and oppositely directed guide elements 35 and 36 of hook shape. By means of the upper guide element 35 the mould part is suspended upon a member 39 of an operating device or operating means, which is longitudinally displaceable in a support 40. With reference to a longitudinal axis 41 of a suitable cooperating moulding tool, clearance is provided between the member 39 of the operating device and the part 30 of the mould middle section on the one hand, as well as the two guide elements 35 and 36 on the other hand, this clearance being available both in the axial as well as the radial direction. This clearance is necessary also on account of the varying thermal expansions of these parts when in operation.

The clearance has the result that when the arrangement is in the rest position shown in FIG. 1 with the mould middle section 43 open, the part 30 of the mould middle section pivots in the counterclockwise direction until the upper outer portion of the guide elements 35 bears against the member 39 of the operating device, and at the lower end in the region of the guide element 36 the part 30 bears directly against the member 39 of the operating device.

Figure 2:
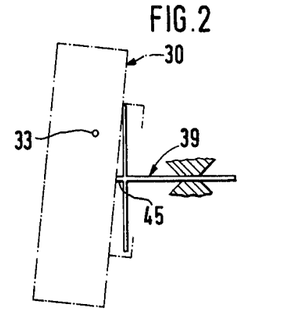

If now the mould middle section 43 is to be closed from the rest position shown in FIG. 1, the member 39 of the operating device is moved to the left. In accordance with FIG. 2 a holding closed force transmission element 45 of the operating member 39 bears upon the part 30 of the mould middle section while, because of the particular position of the center of gravity 33, the part 30 of the mould middle section pivots in the clockwise direction into the position shown in FIG. 2.

Figure 3:
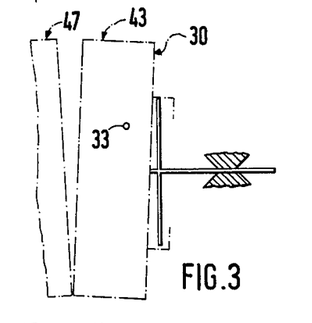

In the further continuance of the closing movement, according to FIG. 3, the lower portion of the mould middle section part 30 comes into contact with another part 47 of the mould middle section. From this point the two parts 30 and 47 of the mould middle section mutually cooperate with each other in their directional movement until they reach the parallel closed position indicated in FIG. 4. In this position the part 30 of the mould middle section is suspended by its upper guide element 35 upon the member 39 of the operating device, while at the lower end there is clearance between the member 39 of the operating device and the guide element 36. By means of the operating device 39 the holding closed force transmission element 45 is forced against the mould middle section part 30 and thereby transmits to said part a holding closed force acting radially with respect to the longitudinal axis 41 and thereby acting in a holding closed force plane 50 directed at right angles to the longitudinal axis 41. This holding closed force has the same line of action but an opposed direction with respect to a resultant opening force due to the internal pressure acting upon the mould middle section part 30 and tending to open the mould middle section from the position shown in FIG. 4. Such opening movement is, however, effectively prevented.

Figure 4:
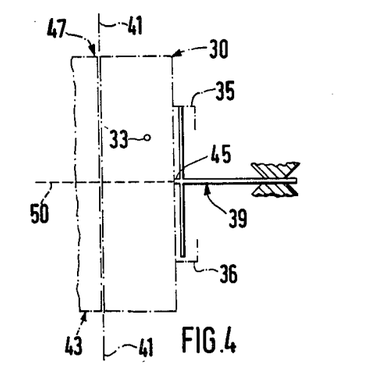
Figure 5:
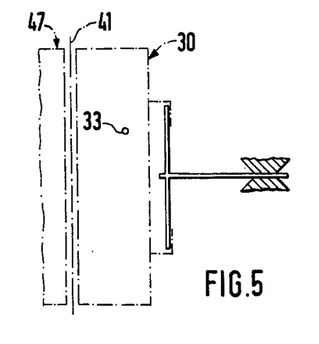

After the conclusion of the moulding operation in the moulding tool, if the mould center section 43 is to be reopened from the closed operating position shown in FIG. 4, the member 39 of the operating device is moved to the right. This movement releases the holding closed force transmission element 45 from the respective part of the mould middle section and the member 39 of the operating device bears at the top and bottom against the guide elements 35 and 36 in its outward movement. At the end of the opening stroke the guide element 36 again releases itself from the member 39 of the operating device until the part 30 of the mould middle section has assumed its initial position according to FIG. 1.

Figure 6:
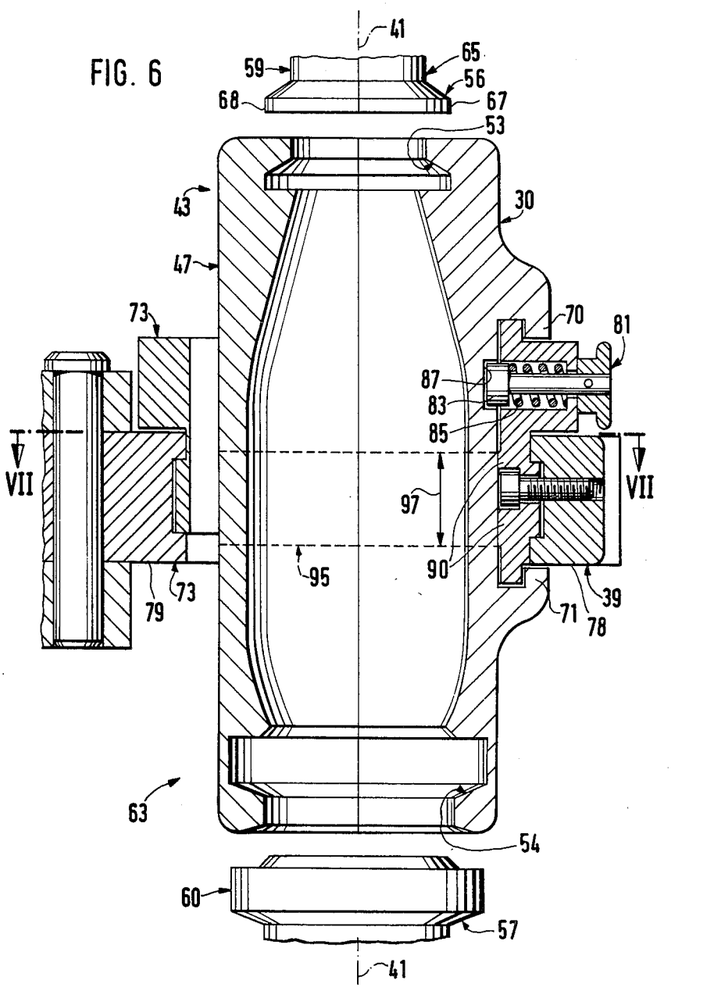
FIG. 6 is a longitudinal section through a finishing moulding tool along the line VI—VI in FIG. 7 on a somewhat enlarged scale.
Figure 7:
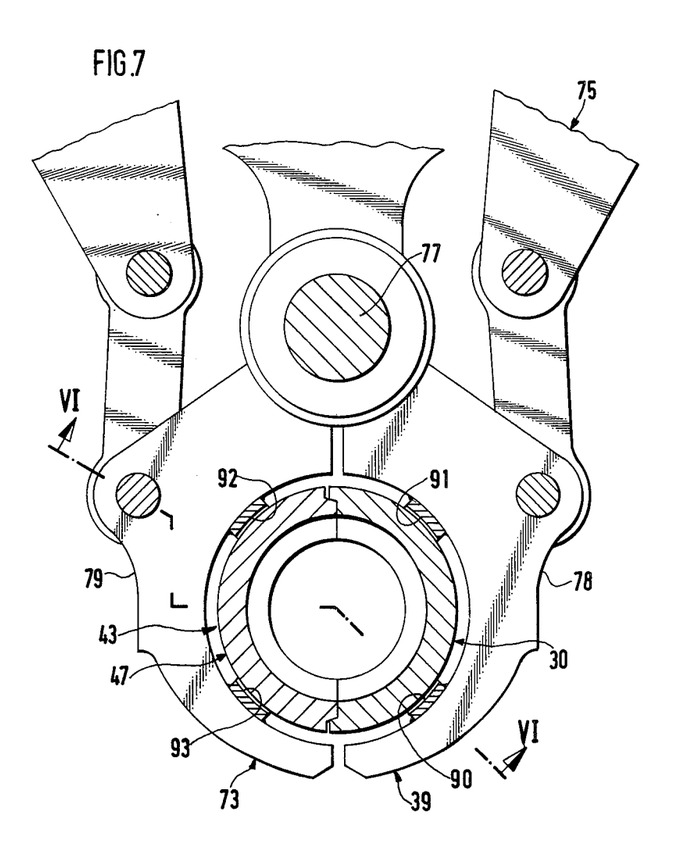
FIG. 7 is a cross-section along the line VII—VII of FIG. 6 on a somewhat reduced scale.

In the case of the mould parts 30 and 47 shown in FIGS. 6 and 7, these are half middle sections of a finishing mould, which have positioning surfaces 53 and 54 engaging over complementary matching surfaces 56 and 57 of a neck mould 59 and a finishing mould bottom 60 respectively. To improve the clarity of the drawing, FIG. 6 shows both the neck mould 59 as well as the finishing mould bottom 60 out of engagement with the mould middle section 43 of the moulding tool 63. The neck mould 59 comprises a split neck moulding tool 65, the halves of which are indicated by 67 and 68.

Each part 30, 47 of the mould middle section is provided at an upper portion or at the top end with two peripherally spaced guide elements, for example 70, and likewise at a lower portion or at the bottom with two peripherally spaced guide elements, for example 71.

The hook-shaped guide elements 70, 71 are pointed towards each other and at one side engage over the member 39 of the operating device and, in the case of the mould middle section 47, engage over a member 73 of an operating device 75. According to FIG. 7, the operating device 75 comprises two halves 78, 79 of a pair of tongs (by known means, not shown in the drawing) and pivotable about a common column 77. When in contrast with the position shown in FIG. 7, the halves of the tongs 78, 79 are opened, the parts 30, 47 of the mould middle section can be pivoted with respect to their longitudinal axis to enable them to be introduced into the member 39, 73 of the operating device, and similarly can be removed therefrom. The securing of the parts 30 and 47 of the mould middle section in the peripheral direction with respect to the operating device members 39, 73 is performed in each case by a locking device, for example 81. The locking device 81 is situated upon the operating device member 39 and includes a bolt 83, which is biased by a spring 85 towards the part 30 of the mould middle section. The bolt 83 engages in a bore 87 of the mould middle section part 30 with clearance on all sides thereof, that is to say with peripheral clearance which is not visible in FIG. 6. Accordingly, even when in the inserted position, the mould middle section part 30 is able to swing in the peripheral direction with respect to the bolt 83 to the extent of the peripheral clearance which is provided. This arrangement facilitates the relative adjustment of the parts 30, 47 of the mould middle section when closing the mould section 43.

Each member 39, 73 of the operating device applies a holding closed force by means of two respective block-shaped holding closed force transmission elements 90, 91 and 92, 93 respectively, these being effective at right angles to the longitudinal axis 41 of the moulding tool 63 within a common holding closed force zone 95 extending over an axial distance 97. The holding closed force transmission elements 90 to 93 are situated in spaced relationship in the peripheral direction.

Figure 8:
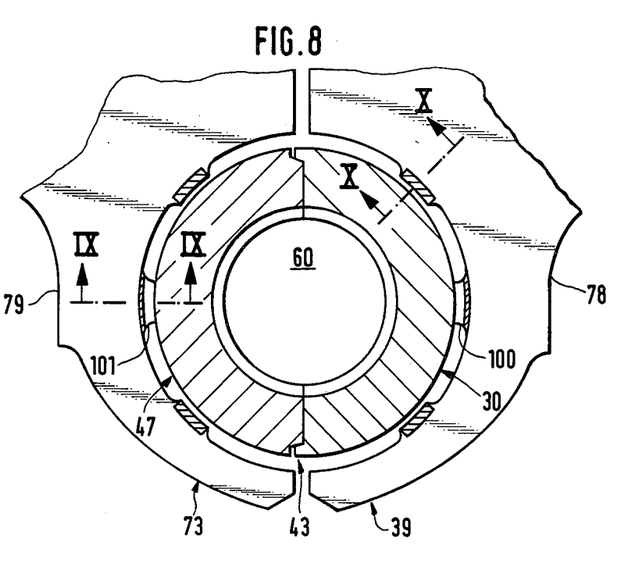
FIG. 8 is a cross-section corresponding to that of FIG. 7 through a mould middle section with an operating device according to the lines VIII—VIII in FIGS. 9 and 10.
Figure 9:
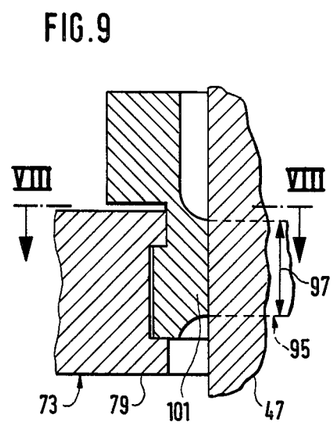
FIG. 9 is a sectional elevation along the line IX—IX of FIG. 8 on an enlarged scale.
Figure 10:
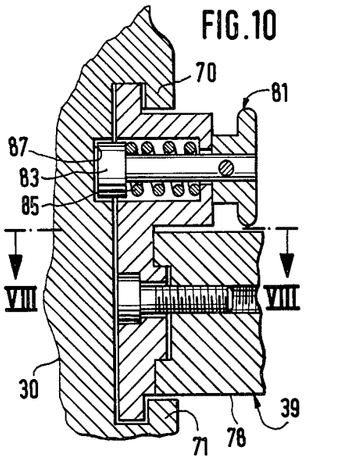
FIG. 10 is a sectional elevation along the line X—X of FIG. 8 on an enlarged scale.

In FIGS. 8 to 10 there is shown a practical form which has similarity with the practical form shown in FIGS. 6 and 7. Equivalent parts are therefore indicated by similar reference characters. Nevertheless, the members 39 and 73 of the operating device shown in FIG. 8 are applied against the two parts 30 and 47 of the mould middle section only by means of a single block-shaped holding closed force transmission element 100 and 101 respectively, these being effective in the holding closed force zone 95 indicated by dashed lines in FIG. 9. Over the entire remainder of the outer surface the members 39 and 73 of the operating device maintain a radial clearance with respect to the mould middle section 43.

Figure 11:
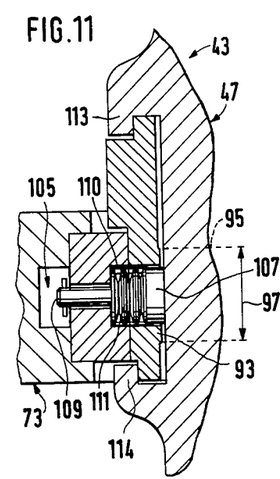
FIG. 11 is a partial longitudinal section of a part of a mould middle section in the open position and biased by means of a spring element.
Figure 12:
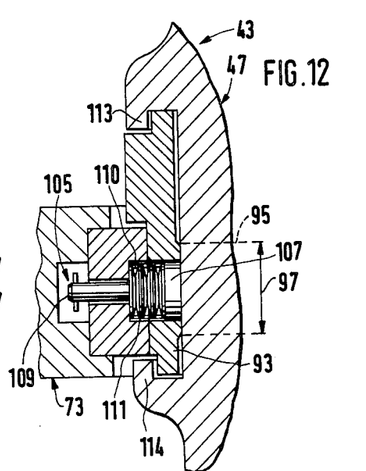
FIG. 12 shows the arrangement according to FIG. 11 with the mould middle section in the closed position.

In FIGS. 11 and 12 the part 73 of the operating device is fitted with a pressure means 105. The pressure means 105 comprise a pressure piston 107 radially penetrating the holding closed force transmission element 93 and having a piston rod 109 slidably guided in the member 73 of the operating device. Besides the pressure piston 107, a stack of spring washers 111 is arranged in a cavity 110 of the operating device member 73, the individual spring washers of the stack being freely displaceable axially upon the piston rod 109.

FIG. 11 shows the conditions when the mould middle section 43 is open. The pressure means 105 then forces the part 47 of the mould middle section by means of its guide elements 113 and 114 into continuous contact with the member 73 of the operating device so that all radial clearance between the member 73 of the operating device and the guide elements 113 and 14 is zero in the outward direction. The holding closed force transmission element 93 is then spaced away from the part 47 of the mould middle section by a radial clearance.

On the other hand, FIG. 12 shows the condition when the mould middle section 43 is closed. Then the holding closed force transmission element 93 bears upon the part 47 of the mould middle section in the holding closed force zone 95, while there is radial clearance on all sides between the part 47 of the mould middle section and the member 73 of the operating device.

Figure 13:
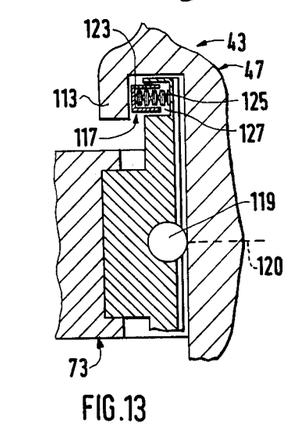
FIG. 13 shows a ball-type of holding closed force transmission element in section.

In FIG. 13, spring means, e.g. 117, are provided to ensure that, both in the open as well as the closed position of the mould middle section 43, one or more peripherally distributed spherical holding closed force transmission elements, e.g. 119, always bear against the part 47 of the mould middle section in a holding closed force plane 120, whose position is indicated by a dashed line. The holding closed force plane 120 extends at right angles to the longitudinal axis, not shown in FIG. 13, of the assembled mounting tool. The spring means 117 comprises an enclosing pressure cap 123 and a stack 125 of plate springs, both of which are partially accommodated in a recess 127 of the member 73 of the operating device.

Figure 14:
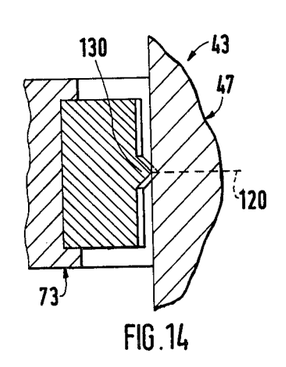
FIG. 14 shows a knife edge type of holding closed force transmission element in section.

In FIG. 14 there is shown the member 73 of the operating device provided with a knife-edge type of holding closed force transmission element 130, whose knife edge bears against the mould middle section part 47 in the holding closed force plane 120.

Figure 15:
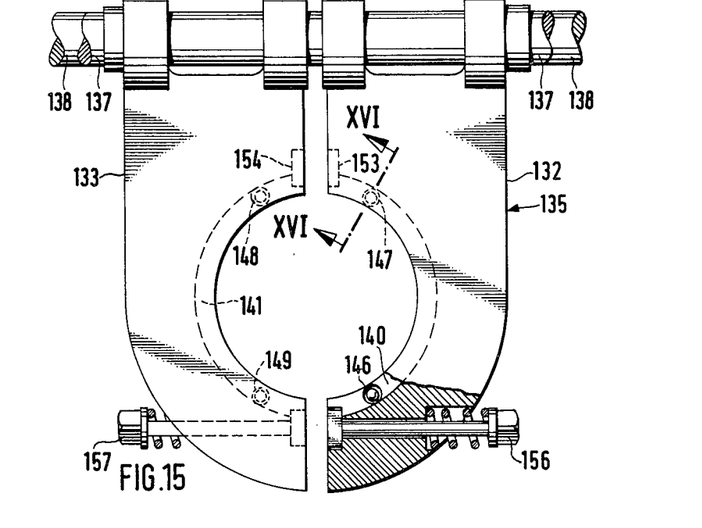
FIG. 15 shows in partial section a plan view of a divided neck mould support.

In FIG. 15 there are shown the two halves 132 and 133 of a neck mould support 135; these being displaceably mounted upon two spaced rods 137 and 138. Each half 132, 133 of the neck mould support is provided with an approximately semicircular groove 140 and 141, in which engages a radial flange 143 of the neck mould 59 indicated by dash and dot lines in FIG. 16. Between the outer periphery of the radial flange 143 and the opposite wall of the groove 140 there is inserted a peripheral corrugated spring 145, which is yieldable to allow a certain amount of radial mobility of the neck mould 59 with respect to the neck mould support 135.

The neck mould 59 is, however, also resiliently movable in the axial direction with respect to the neck mould support 135. This facility is provided by two spring elements 146, 147; 148, 149 provided in respect of each half 132, 133 of the neck mould support.

Figure 16:
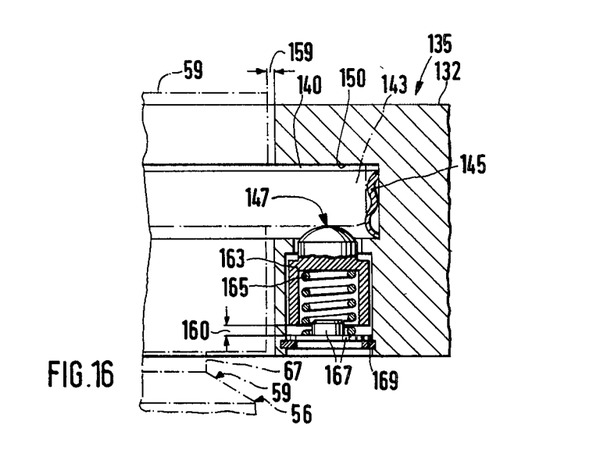
FIG. 16 shows a sectional view along the line XVI—XVI of FIG. 15 on an enlarged scale.

FIG. 16 shows the condition when the moulding tool 63 is open. The half 67 of the neck moulding tool is suspended by its half of the radial flange 143 upon the spring elements 146 and 147, and is forced upwardly by these spring elements into contact with the opposing wall 150 of the groove 140. Thereby the half 67 of the neck moulding tool is accurately centered with respect to the appertaining half 68 of the neck moulding tool visible in FIG. 6, so that the closing of the entire moulding tool is substantially facilitated and proceeds with an extremely small amount of wear on the tool.

Stops 153 and 154, rigidly built into the halves 132, 133 of the neck mould support, and oppositely positioned releasable locking devices 156 and 157 hold the radial flange 143 of the halves 67, 68 of the neck moulding tool with the necessary clearance positioned in the grooves 140, 141 even when the moulding tool is in the open position.

The maximum radial clearance of the neck mould 59 with respect to the neck mould support 135 is indicated in FIG. 16 by the reference 159. The axial length of the spring path of the neck mould 59 with respect to the neck mould support 135 is indicated by 160.

Each spring element, e.g. 147, includes an upwardly directed spherical pressure cap 163, which supports itself upon a spring plate 167 by means of a prestressed helical spring 165, the spring plate itself being supported upon a locking ring 169 in the neck mould support 135.

When starting from the condition according to FIG. 16, the moulding tool is required to be closed, then the parts 30, 47 of the mould middle section, e.g. according to FIG. 6, are approached towards each other and bring their positioning surface 53 into engagement over the opposing surface 56 on the neck mould 59. By reason of the comparatively weak bias of the helical springs 165, the neck mould 59 is thereby drawn slightly downwardly in an axial direction until the position is reached in which there is secure positive clamping between the mould middle section 43 and the neck mould 59.

Figure 17:
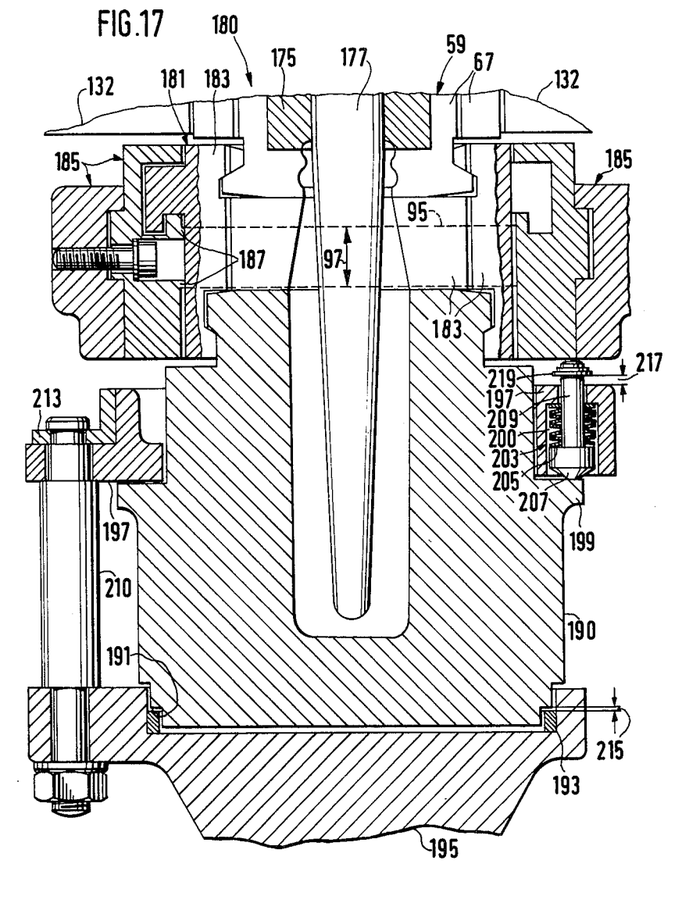
FIG. 17 shows a longitudinal section through a parison moulding tool according to the invention.

In FIG. 17 the neck mould 59 includes, besides the neck mould halves, e.g. 67, an undivided guide ring 175 for a press plunger 177. The plane of division between the two halves of the neck moulding tool lies in the plane of the drawing of FIG. 17.

A moulding tool 180, which is in fact a parison mould, comprises in addition to the neck mould 59, a divided mould middle section 181, the parts of which, e.g. 183, are respectively suspended in an operating device member, e.g. 185. Similar to the arrangement in the previously described practical forms, the transmission of the holding closed force into the mould middle section 181 is effected by means of block-shaped holding closed force elements, e.g. 187, belonging to the operating device members, e.g. 185. The section portions taken to the left and right outwardly on the mould center section 181 and the operating device member 185 are shown turned into the plane of the drawing.

At the lower end the mould middle section 181 engages over a block mould 190, which by means of an annular face 191 bears upon a support ring 193 of a block mould support 195 when the moulding tool 180 is in the open position. An undivided clamping ring 197 overhangs an annular shoulder 199 of the block mould 190 and is provided with three uniformly spaced peripheral cavities 200, only one of which is shown at the right side of FIG. 17, in each of which is housed a spring element 203. Each spring element 203 comprises a pressure piston 207 backed by a piston rod 209 and forced by the bias of a stack 205 of spring washers against the annular shoulder 199.

Three tie rods 210, only one of which is shown at the left side of FIG. 17, are uniformly spaced about the periphery holding the clamping ring 197 at a constant axial distance from the block mould support 195, and are each locked with respect to the clamping ring 197 by a locking bar 213.

When the moulding tool 180 is required to be closed, the mould middle section 181 is then closed by means of the operating device members, e.g. 185, and thereby engages over the neck mould 59 at the top and over the block mould 190 at the bottom. In this closing operation the block mould 190 is lifted in the axial direction from the support ring 193 by a distance 215. Because this distance 215 is smaller than the distance 217, which is under spring control, between the clamping ring 197 and a locking ring 219 of the piston rod 209, the block mould, when the moulding tool 180 is in the open position, has its annular face 191 pressed against the support ring 193 by the action of the spring elements 203.

Figure 18:
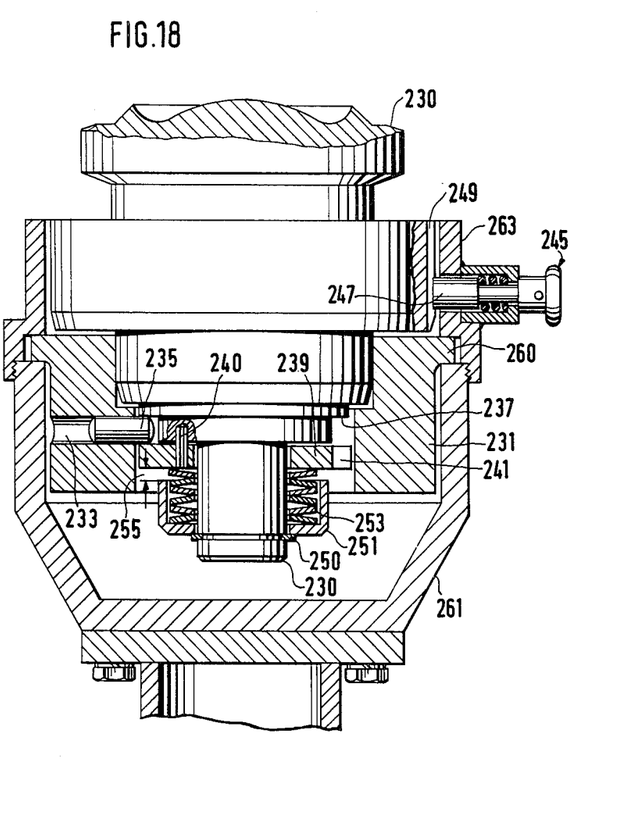
FIG. 18 is a longitudinal section through a finishing mould bottom designed in accordance with the invention.

In FIG. 18 a finishing mould bottom 230 is shown inserted in a support ring 231. In each of three bores 233 uniformly spaced about the periphery of the support ring 231 (only one of the bores is shown in FIG. 18) there is fitted a pin 235. In the open condition of the moulding tool, a shoulder 237 of the finishing mould bottom 230 rests upon pins 235. An annular spring plate 239 is locked against rotation with respect to the finishing mould bottom 230 by means of a pin 240, and bears against the lower side of the three pins 235. The spring plate 239 is provided around its periphery with three mounting slots 241, only one of which is shown in FIG. 18, whose angular positions correspond to those of the pins 235, and which, when in coincidence, provide for a bayonet-type connection of the finishing mould bottom 230 into the support ring 231. As soon as this connection is completed a locking device 245, corresponding to the locking device 81, is operated and its pin 247 engages in an axial groove 249 of the finishing mould bottom 230 with clearance on all sides.

A locking ring 250 of the finishing mould bottom 230 supports a cap 251, between which and the spring plate 239 there is arranged a biased stack 253 of spring washers. Between the cap 251 and the spring plate 239 there is defined the maximum axial path 255 of spring movement between the finishing mould bottom 230 and the support ring 231.

The support ring 231 is provided at its top end with an annular flange 260, which is arranged to be a sliding fit between a finishing mould bottom support 261 and a mounting ring 263 threaded over said support. The mounting ring 263 carries the locking device 245. By the provision of the above-mentioned sliding fit it is possible for the support ring 231 with the finishing mould bottom 230 to have a certain radial movement with respect to the finishing mould bottom support 261 and its mounting ring 263, and in this way to compensate for any eventual alignment faults between the finishing mould bottom 230 and the other components of the appertaining moulding tool.

Figure 19:
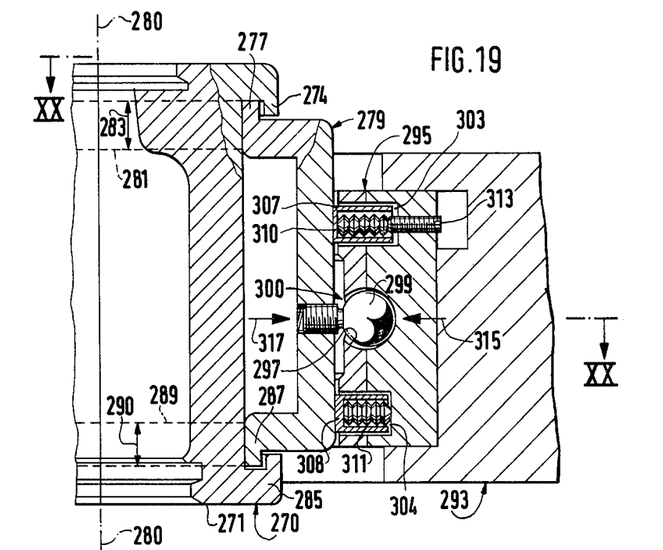
FIG. 19 is a partially broken sectional view along the line XIX—XIX of FIG. 20 of an operating device with a pivoting frame.
Figure 20:
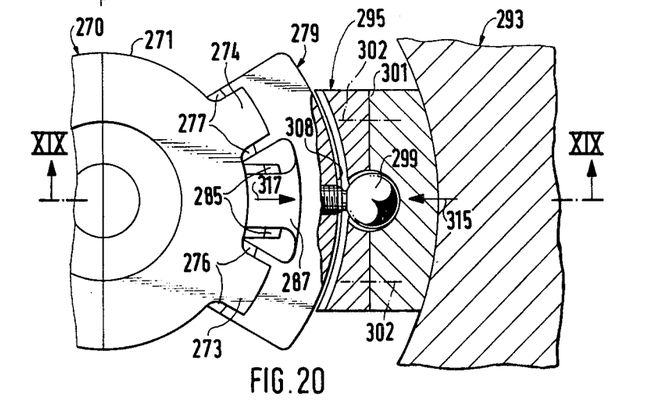
FIG. 20 is the sectional view along the line XX—XX of FIG. 19.

In FIGS. 19 and 20 there is shown a mould middle section 270 in the closed condition, but without any neck mould and finishing mould bottom. Each part of the mould middle section, e.g. 271, is suspended by means of two guide elements 273 and 274 upon two block-shaped holding closed force transmission elements 276 and 277 of a pivoting frame 279, which elements engage the mould middle section parts 271 over a common holding closed force zone 281 extending at right angles to a longitudinal axis 280 of the moulding tool and having an axial dimension 283. An oppositely directed hook-shaped guide element 285 engages from below over a third centrally located holding closed force transmission element 287, which transmits its own component of the total holding closed force over a holding closed force zone 289 also indicated by the dashed lines, directed at right angles to the longitudinal axis 280 and having the axial dimension 290.

The pivoting frame 279 is a component of an operating device member 293, which also includes a carrier 295 with a ball socket 297 for a ball 299 of the pivoting frame 279. The ball 299 and the ball socket 297 form a joint or force transmitting means 300. The carrier 295 is split along a plane 301 parallel to the longitudinal axis 280 for mounting the ball 299. The parts of the carrier are connected together by screws, whose center lines are indicated at 302 in FIG. 20.

The carrier 295 is provided with two cavities 303 and 304, into each of which there is inserted a respective pressure cap 307 and 308 and a plate spring stack 310 and 311 respectively. In the carrier 295 there is threaded an adjusting screw 313, against which there is supported the one end of the plate spring stack 310. By means of the adjusting screw 313 it is possible to adjust the pivoting frame 279 into a defined rest position. For example, it is possible in this way to make the initial bias of the plate spring stack 311 greater than that of the stack 310.

A resultant holding closed force component 315 exerted by the operating device member 293 upon the mould middle section 291 is directed through the center point of the ball 299 and in the line of action of a resultant opening force component 317 exerted upon the mould middle section part 271. This resultant holding closed force 315 is transmitted by three components through the respective holding closed force transmission elements 276, 277 and 287 into the mould middle section part 271.

It will be understood that each of the elements described above, or two or more together, may also find a useful application in other types of moulding tools differing from the types described above.

While the invention has been illustrated and described as embodied in a moulding tool for plastic material, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a moulding tool for a machine for moulding plastic material, especially molten glass, a combination comprising at least one middle mould section having a longitudinal axis and being divided into a plurality of cooperating middle mould section parts; a pair of axially spaced guide elements for each of said middle mould section parts, each of said pair of guide elements being connected to the respective middle mould section part and having a surface normal to said longitudinal axis and facing a corresponding surface of the other of said guide elements, at least one of said guide elements which is located above the other guide element of each pair being hook shaped; and operating means having means for supporting each of said middle section mould parts with radial clearance in said hook-shaped guide element and transmission means located between said surfaces of said guide elements for applying a force to the respective middle mould section part for holding the latter closed against forces tending to move said middle mould section part to an open position during operation of said moulding tool and insertion of molten material thereinto, the resultant holding closed force being located substantially in an application plane intermediate said surfaces of said guide elements and extending at right angles to said axis and the resultant of said opening forces lying also substantially in said plane.

2. A combination as defined in claim 1, wherein each mould middle section part is insertable into and removable from the associated support means by pivoting the part about said longitudinal axis, and including releasable locking means movable between an inactive and a locking position to prevent in the latter pivoting movement of said part about said longitudinal axis.

3. A combination as defined in claim 1, and including at least one pressure means for each of said support means constantly bearing against the associated mould middle section part and eliminating in an open position of said mould middle section radial any clearance in one direction between said support means and the respective guide elements.

4. A combination as defined in claim 3, wherein said pressure means is located substantially in said application plane.

5. A combination as defined in claim 1, and including a neck mould, said mould middle section parts and said neck mould having cooperating portions provided with positioning surfaces arranged to provide, on closure of said mould, a three-dimensional adjustment of the relative position of said neck mould and said middle mould section; and further including a neck mould support mounting said neck mould movable in axial direction and spring means between said neck mould support and said neck mould for biasing the latter in axial direction.

6. A combination as defined in claim 5, wherein said neck mould is mounted on said neck mould support movable in radial direction.

7. A combination as defined in claim 1, and including a mould bottom part, said mould middle section parts and said mould bottom part having cooperating portions provided with positioning surfaces arranged to provide, upon closure of said mould, a three-dimensional adjustment of the relative position of said bottom mould part and said middle mould section; and further including a mould bottom part support mounting said mould bottom part movable in axial direction, and spring means between said mould bottom part support and said mould bottom part for biasing the latter in axial direction.

8. A combination as defined in claim 7, wherein said mould bottom part is mounted in said mould bottom part support movable in radial direction.

9. A combination as defined in claim 7, wherein said mould bottom part is a block mould.

10. A combination as defined in claim 7, wherein said mould bottom part is a parison mould bottom.

11. A combination as defined in claim 7, wherein said mould bottom part is a finishing mould bottom.

12. A combination as defined in claim 1, wherein said supporting means comprise a member having an upwardly projecting portion engaged in said hook-shaped guide element and wherein said transmission means comprises a portion of said member directly engaging the respective middle mould section part substantially in said application plane.

13. A combination as defined in claim 12, wherein said portion is a substantially flat portion extending to opposite sides of said application plane and engaging a complementary contact surface of the associated middle section part.

14. A combination as defined in claim 12, wherein said portion is of spherical shape and engages the associated middle mould section part in said application plane.

15. A combination as defined in claim 12, wherein said portion is in the form of a knife edge which engages the associated middle mould section part in said application plane.

16. A combination as defined in claim 1, wherein both of said guide elements are hook shaped, and wherein said operating means comprises an operating member for each of said middle mould section parts, said support means comprises a pivot frame having upper and lower portions respectively located with radial clearances in said hook-shaped guide elements of the associated middle mould section part and engaging the latter in two zones respectively located to opposite sides of said application plane, said transmission means being constituted by a ball joint having its center in said application plane and transmitting the resultant holding closed force from said operating member to said pivot frame.

17. A combination as defined in claim 16, and including between each operating member and the associated pivot frame at least one spring biased element, and means for adjusting the force of the spring of said spring biased element for holding the respective pivot frame in a predetermined position when said middle section parts are in the open position thereof.

* * * * *